United States Patent
Zhao et al.

(10) Patent No.: US 12,534,311 B2
(45) Date of Patent: Jan. 27, 2026

(54) GOODS PICK-UP MECHANISM, DESTACKING APPARATUS AND DESTACKING METHOD

(71) Applicants: Luzhou Laojiao Co., Ltd., Luzhou (CN); Luzhou Laojiao Niangjiu Co., Ltd., Luzhou (CN); Qingzhou Pengcheng Packaging Machinery Co., Ltd., Weifang (CN)

(72) Inventors: Bingkun Zhao, Luzhou (CN); Tao Hu, Luzhou (CN); Junwu Lin, Luzhou (CN); Qianjing Xu, Luzhou (CN); Ziji Lin, Luzhou (CN); Xin Liu, Luzhou (CN); Chuanpeng Hao, Luzhou (CN)

(73) Assignees: Luzhou Laojiao Co., Ltd., Luzhou (CN); Luzhou Laojiao Niangjiu Co., Ltd., Luzhou (CN); Qingzhou Pengcheng Packaging Machinery Co., Ltd., Weifang (CN)

( * ) Notice: Subject to any disclaimer, the term of this patent is extended or adjusted under 35 U.S.C. 154(b) by 0 days.

(21) Appl. No.: 18/940,333

(22) Filed: Nov. 7, 2024

(65) Prior Publication Data

US 2025/0153960 A1 May 15, 2025

(30) Foreign Application Priority Data

Nov. 10, 2023 (CN) .......................... 202311500556.2

(51) Int. Cl.
*B65G 59/04* (2006.01)
*B25J 15/06* (2006.01)

(52) U.S. Cl.
CPC .......... *B65G 59/04* (2013.01); *B25J 15/0625* (2013.01)

(58) Field of Classification Search
CPC ................ B25J 15/0061; B25J 15/0616; B25J 15/0625; B25J 15/0675; B65G 47/91; B65G 59/04
(Continued)

(56) References Cited

U.S. PATENT DOCUMENTS 3,865,420 A * 2/1975 Warren ................. B66C 1/0256
294/184
4,089,622 A * 5/1978 Aubel ....................... F04F 5/44
417/189
(Continued)

FOREIGN PATENT DOCUMENTS

CN 205367099 U 7/2016
CN 111908148 A 11/2020
(Continued)

OTHER PUBLICATIONS

First Office Action of Corresponding Chinese Application No. 2023115005562 mailed May 16, 2024, 11 pages.
(Continued)

*Primary Examiner* — Gregory W Adams
(74) *Attorney, Agent, or Firm* — Dinsmore & Shohl LLP

(57) ABSTRACT

The goods pick-up mechanism comprises a frame body connected to a robotic arm, a suction component arranged on one side of the frame body towards goods to be picked up, and a vacuum generator fixedly mounted on the frame body, and an air distributor fixedly mounted on the frame body and connected between the vacuum generator and the suction component. One end of the vacuum generator is configured to be connected to an air source and the other end thereof is connected to the suction component for generating and providing a negative pressure to the suction component.

8 Claims, 3 Drawing Sheets

(58) Field of Classification Search
USPC ...... 414/793, 797, 799; 901/40; 294/183, 65
See application file for complete search history.

(56) References Cited

U.S. PATENT DOCUMENTS

| | | | | |
|---|---|---|---|---|
| 4,228,993 | A * | 10/1980 | Cathers | B65G 49/068 198/750.12 |
| 7,267,382 | B2 * | 9/2007 | Gieskes | H05K 13/0409 294/64.2 |
| 7,632,452 | B2 * | 12/2009 | Saijo | B65G 47/918 264/630 |
| 8,534,727 | B2 * | 9/2013 | Weclawski | B65G 47/918 414/749.5 |
| 8,777,284 | B2 * | 7/2014 | Schaller | H01L 21/677 294/185 |
| 9,656,813 | B2 * | 5/2017 | Dunkmann | B25J 15/0675 |
| 9,669,550 | B2 * | 6/2017 | Accou | H05K 13/0409 |
| 2019/0143536 | A1 * | 5/2019 | Tell | F04F 5/44 294/64.3 |
| 2021/0138123 | A1 * | 5/2021 | Minskoff | A61M 1/732 |
| 2021/0371214 | A1 * | 12/2021 | Buffat | B65G 47/917 |
| 2022/0033199 | A1 * | 2/2022 | Secibovic | B66C 1/0218 |

FOREIGN PATENT DOCUMENTS

| | | |
|---|---|---|
| CN | 114249114 A | 3/2022 |
| CN | 217890994 U | 11/2022 |
| CN | 217996000 U | 12/2022 |
| JP | 2000343471 A | 12/2000 |
| KR | 20100129992 | 12/2010 |

OTHER PUBLICATIONS

Second Office Action Corresponding Chinese Application No. 2023115005562 mailed Aug. 14, 2024, 12 pages.

Third Office Action of Corresponding Chinese Application No. 2023115005562 mailed Oct. 21, 2024, 11 pages.

\* cited by examiner

GOODS PICK-UP MECHANISM, DESTACKING APPARATUS AND DESTACKING METHOD

CROSS REFERENCE OF RELATED APPLICATION

This application claims priority to Chinese Patent Application No. 202311500556.2, filed Nov. 13, 2023, which is hereby incorporated by reference in its entirety.

FIELD OF THE INVENTION

The present invention relates to the field of destacking technology, and specifically to a goods pick-up mechanism, a destacking apparatus and a destacking method.

BACKGROUND OF THE INVENTION

Before leaving the factory, alcohol products typically undergo a series of operational processes including bottling, labeling, packing and sealing. When packing on a packaging production line, stacks of packaging boxes need to be carried to a packing station, and then conveyed by a conveyor belt to subsequent stations for operations such as packaging and sealing.

In the prior art, the stacks of packaging boxes are mostly manually carried to the packing station, which is not in line with the requirements of high efficiency, high profitability and high automation of modern factories and enterprises due to the high labor intensity, low efficiency and high manual-work time consumed in manual transporting.

SUMMARY OF THE INVENTION

In view of this, the present invention provides a goods pick-up mechanism, a destacking apparatus and a destacking method, in order to solve the problem of high labor intensity and low efficiency in manual transporting and destacking in the prior art.

In a first aspect, the present invention provides a goods pick-up mechanism comprising a frame body, a suction component, a vacuum generator and an air distributor, wherein the frame body is configured to be connected to a robotic arm, at least one suction component is arranged on one side of the frame body towards goods to be picked up, the vacuum generator is fixedly mounted on the frame body, wherein one end of the vacuum generator is configured to be connected to an air source and the other end thereof is connected to the suction component, for generating and providing a negative pressure to the suction component, the air distributor is fixedly mounted on the frame body, wherein the air distributor is connected between the vacuum generator and the suction component.

Beneficial effect: by connecting the vacuum generator to the suction component, when destacking goods, the frame body is moved to the position of the goods and the suction component is brought into contact with a surface of the goods, and the negative pressure generated by the vacuum generator is communicated to each suction component respectively through the air distributor to suck out the air between the surface of the goods and the suction component, so that the goods are adsorbed onto the suction component and the goods can be transferred by moving the frame body without manual transporting, which saves labor and improves the efficiency of transporting, thereby facilitating the subsequent processes.

In an optional embodiment, the vacuum generator is provided with an air inlet, an air outlet and a negative pressure port, the air inlet, the air outlet and the negative pressure port are interconnected, the air inlet is configured to be connected to the air source for inputting air, the air outlet is connected to external environment for discharging air, and the negative pressure port is connected to the suction component for outputting air between the suction component and the goods to be picked up to the air outlet.

Beneficial effect: by connecting the air inlet to the air source, when the goods are being picked up, the air is input into the vacuum generator from the air source and is output through the air outlet, and because the air outlet and the negative pressure port are interconnected, when the air is being output through the air outlet, the internal pressure of the vacuum generator decreases, causing the air at the negative pressure port to flow towards the air outlet and be output, so that the negative pressure port is kept at a low pressure, and because the negative pressure port is connected to the suction component, the air between the suction component and the goods is discharged through the air outlet, thereby the goods are adsorbed onto the suction component, which has the advantages of a simple structure, convenient operation, and good adsorption effect.

In an optional embodiment, each suction component comprises an air guiding member and a suction cup, the air guiding member is fixedly mounted on the side of the frame body towards the goods to be picked up, wherein the air guiding member is connected to the negative pressure port, one end of the suction cup is connected to the air guiding member and the other end is configured to abut against the goods to be picked up.

Beneficial effect: by providing the suction cup, the contact area between the suction component and the goods is increased, so that the goods are adsorbed more firmly when being picked up, and will not fall off during transportation and movement.

In an optional embodiment, the air distributor is provided with one input port and a plurality of output ports, the input port is connected to the negative pressure port, a plurality of air guiding members are spaced apart on the frame body, and each air guiding member is respectively connected to the plurality of output ports.

Beneficial effect: by providing the air distributor, the negative pressure generated by the vacuum generator can be interconnected to the plurality of suction components, so as to adsorb the goods more firmly and avoid damage caused by the goods falling off during transportation.

In an optional embodiment, the goods pick-up mechanism further comprises a pressure regulating valve provided on the frame body, wherein the pressure regulating valve is configured to be connected between the air source and the air inlet.

Beneficial effect: by providing the pressure regulating valve, the air pressure input to the vacuum generator can be adjusted, so that the pressure for generating negative pressure can be adjusted, so as to adjust the adsorption pressure to different levels for different goods, thereby increasing the scope of applicability of the goods pick-up.

In an optional embodiment, the goods pick-up mechanism further comprises a switch provided on the frame body, wherein the switch is configured to be connected between the air source and the pressure regulating valve.

Beneficial effect: by providing the switch, the air fed to the vacuum generator can be turned off when the goods are not being picked up, thereby avoiding air waste and saving air resources.

In an optional embodiment, the goods pick-up mechanism further comprises a connection plate provided on the other side of the frame body away from the goods to be picked up, wherein the connection plate is configured to be connected to the robotic arm.

In a second aspect, the present invention also provides a destacking apparatus comprising the goods pick-up mechanism as described above.

In an optional embodiment, the destacking apparatus further comprises a robotic arm and an actuator, wherein one end of the robotic arm is connected to the frame body, the actuator is connected to the other end of the robotic arm away from the frame body.

Beneficial effect: by providing the robotic arm, it is easy to move the frame body to different positions, so that the goods on different stacks can be picked up, thereby increasing the range of the goods pick-up.

In a third aspect, the present invention also provides a destacking method, using the destacking apparatus described above, wherein the method comprises the following steps:

activating a switch to connect the air source to the vacuum generator;

adjusting a pressure regulating valve so that an air pressure that is input to the vacuum generator can generate sufficient negative pressure for picking up the goods;

driving the robotic arm by the actuator to cause the robotic arm to move to a position of the goods to be picked up, and moving a suction cup towards the goods to be picked up;

after the suction cup picks up the goods, the actuator drives the robotic arm move to an unloading position.

Since the destacking apparatus and the destacking method adopt the goods pick-up mechanism as described above, they therefore have the same beneficial effects as those of the goods pick-up mechanism, which will not be repeated herein.

DETAILED DESCRIPTION OF THE INVENTION

In order to make the objectives, technical solutions and advantages of the embodiments of the present invention clearer, hereinafter, the technical solution in the embodiments of the present invention will be clearly and completely described in combination with accompanying drawings in the embodiments of the present invention. Apparently, the described embodiments only represent part of the embodiments of the present invention, rather than all of them. All other embodiments obtained by those skilled in the art based on the embodiments of the present invention without creative labor expenditure all fall within the scope of protection of the present invention.

Figure 1:
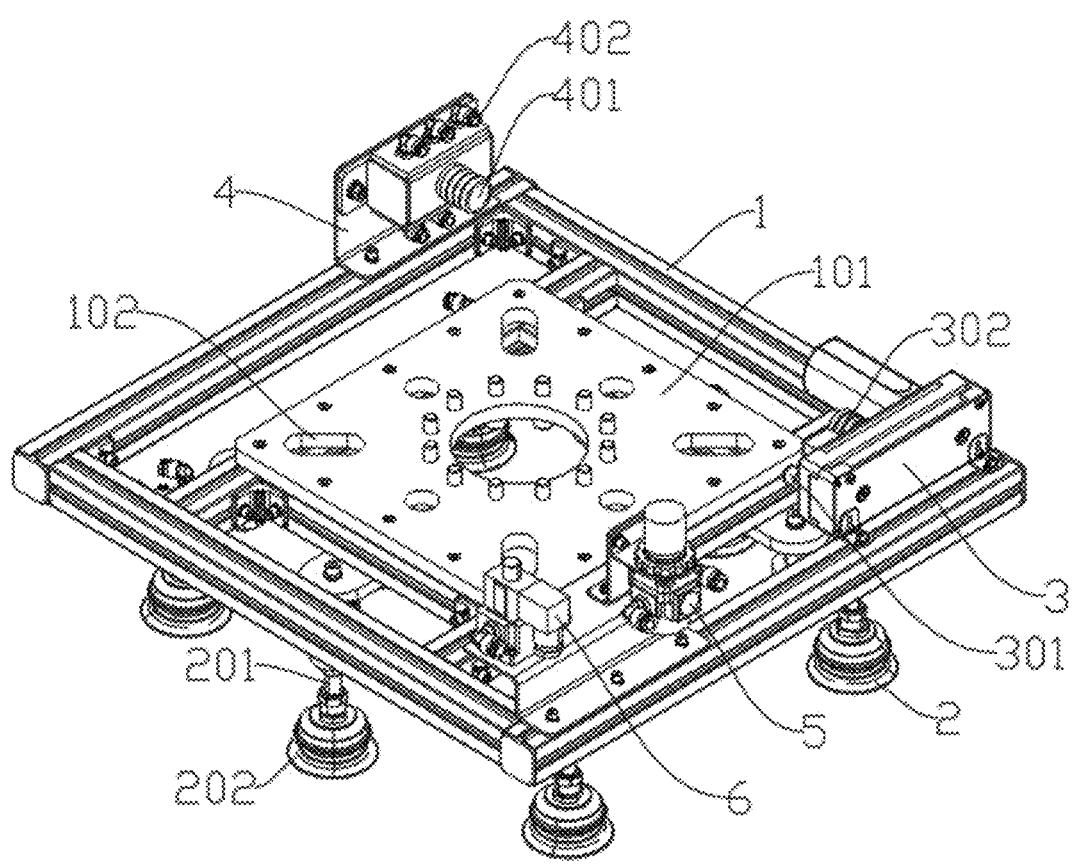
FIG. 1 is a three-dimensional structural schematic diagram of a goods pick-up mechanism of an embodiment of the present invention.
Figure 2:
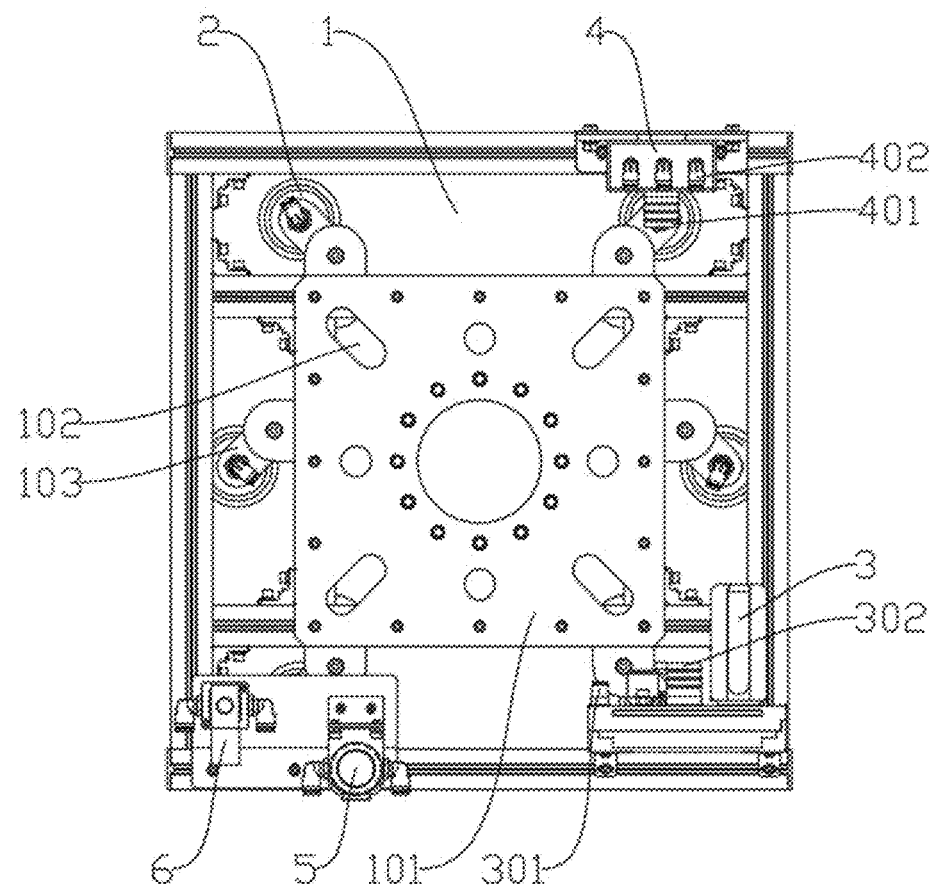
FIG. 2 is a top view of the goods pick-up mechanism shown in FIG. 1.
Figure 3:
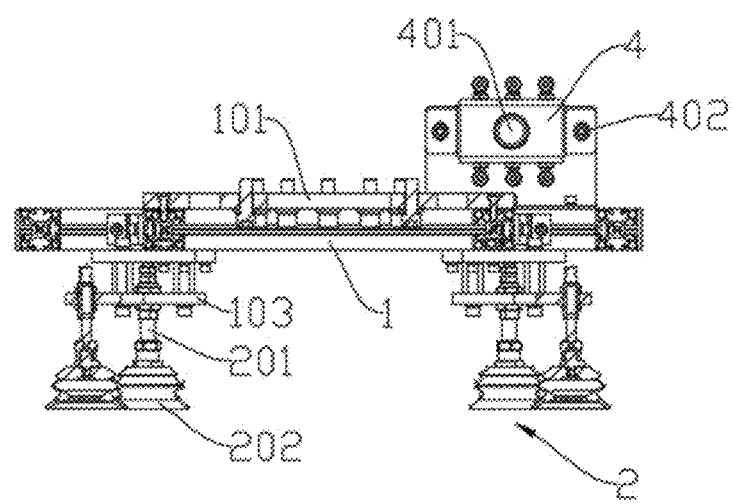
FIG. 3 is a front view of the goods pick-up mechanism shown in FIG. 1.
Figure 4:
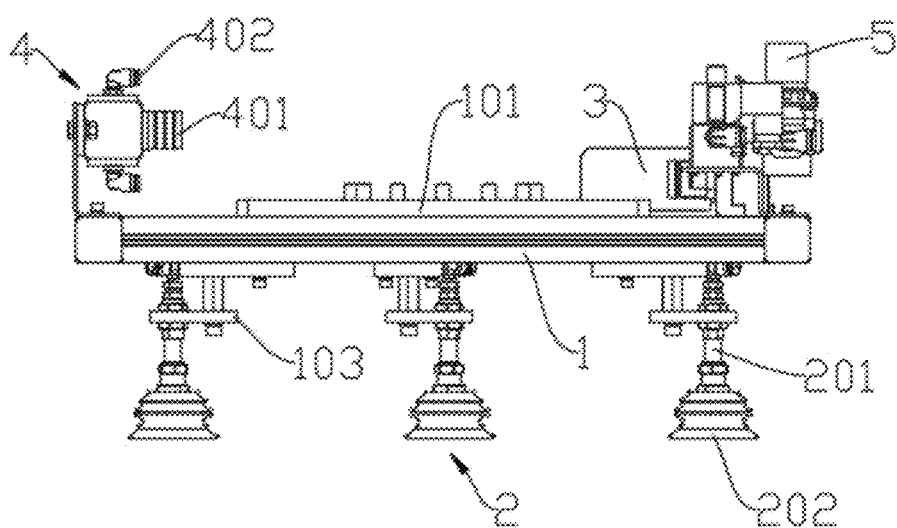
FIG. 4 is a side view of the goods pick-up mechanism shown in FIG. 1.

Embodiments of the present invention are described below in combination with FIGS. 1 to 4.

According to an embodiment of the present invention, in a first aspect, a goods pick-up mechanism is provided, and as shown in FIGS. 1 to 4, the goods pick-up mechanism comprises a frame body 1, a suction component 2, a vacuum generator 3 and an air distributor 4, the frame body 1 being configured to be connected to a robotic arm, at least one suction component 2 being arranged on one side of the frame body 1 towards goods to be picked up, the vacuum generator 3 being fixedly mounted on the frame body 1, wherein one end of the vacuum generator 3 is configured to be connected to an air source and the other end thereof is connected to the suction component 2, for generating and providing a negative pressure to the suction component 2, the air distributor 4 being fixedly mounted on the frame body 1, wherein the air distributor 4 is connected between the vacuum generator 3 and the suction component 2.

Specifically, the goods to be picked up in this embodiment are not specifically limited, in order to conform to the reality, the goods to be picked up in this embodiment are boxes used in the production of a winery, the boxes are flattened and stacked in bundles on pallets or shelves, when the boxes are used for packing finished wine products in production, stacked bundles of boxes need to be carried to a packing station, to facilitate the subsequent packing and other processes.

In this embodiment, the frame body 1 adopts a framework structure, the frame body 1 being enclosed on all sides by rectangular tubes to form a rectangular shape, a plurality of suction components 2 being mounted at the bottom of the rectangular tubes, and the upper part of the rectangular tubes being configured to connect to the robotic arm. In some other embodiments, the frame body 1 may also be an integrally molded monolithic structure or a steel plate, whereas the use of the rectangular tube structure may reduce the overall weight of the frame body 1, thereby making the goods pick-up mechanism lighter and more flexible when moving.

In this embodiment, the vacuum generator 3 is used to generate negative pressure, the vacuum generator 3 being connected to the suction component 2, and when the suction component 2 picks up the boxes, the vacuum generator 3 can extract the air between the suction component 2 and the boxes by means of the negative pressure, so as to maintain a vacuum state between the suction component 2 and the boxes, so that the boxes can be securely picked up onto the suction component 2 during movement, and when it has been moved to the desired position, the negative pressure in the vacuum generator 3 is turned off, so that air flows back to between the suction component 2 and the boxes, thereby disengaging the boxes from the suction component 2.

By connecting the vacuum generator 3 to the suction component 2, when the boxes are being destacked, the frame body 1 is moved to the position of the boxes and the suction component 2 is brought into contact with a surface of the boxes, and the negative pressure generated by the vacuum generator 3 is communicated to each suction component 2 respectively via the air distributor 4 to suck out the air between the surface of the boxes and the suction component 2, so that the boxes are adsorbed onto the suction component 2 and the bundles of boxes can be transferred by moving the frame body 1 without manual transporting, which saves labor and improves the efficiency of transporting, thereby facilitating the subsequent processes.

In one embodiment, the vacuum generator 3 is provided with an air inlet 301, an air outlet and a negative pressure port 302, the air inlet 301, the air outlet and the negative pressure port 302 are interconnected, the air inlet 301 is configured to be connected to the air source for inputting air, the air outlet is connected to external environment for discharging air, and the negative pressure port 302 is connected to the suction component 2 for outputting air between the suction component 2 and the boxes to be picked up to the air outlet.

Specifically, in this embodiment, the vacuum generator 3 has a hollow cavity therein, the air source connected to the air inlet 301 outputs compressed air, and the compressed air in a positive pressure state enters the vacuum generator 3 through the air inlet 301 and is output through the air outlet, and because the air outlet and the negative pressure port 302 are interconnected, when the compressed air is output through the air outlet, it can take away the air at the negative pressure port 302, so as to keep the negative pressure port 302 in a negative pressure state.

By connecting the air inlet 301 to the air source, when the boxes are being picked up, the air is input into the vacuum generator 3 from the air source and is output through the air outlet, and because the air outlet and the negative pressure port 302 are interconnected, when the air is being output through the air outlet, the internal pressure of the vacuum generator 3 decreases, causing the air at the negative pressure port 302 to flow towards the air outlet and be output, so that the negative pressure port 302 is kept at a low pressure, and because the negative pressure port 302 is connected to the suction component 2, the air between the suction component 2 and the boxes is discharged through the air outlet, so that the boxes are adsorbed onto the suction component 2, which has the advantages of a simple structure, convenient operation, and good adsorption effect.

In one embodiment, each suction component 2 comprises an air guiding member 201 and a suction cup 202, the air guiding member 201 being fixedly mounted on the side of the frame body 1 towards the boxes to be picked up, wherein the air guiding member 201 is connected to the negative pressure port 302, one end of the suction cup 202 is connected to the air guiding member 201 and the other end thereof is configured to abut against the boxes to be picked up.

Specifically, in this embodiment, there are four suction components 2, and the suction components 2 are uniformly distributed on the bottom side of the frame body 1. In some other embodiments not shown, it is also possible to provide other numbers of suction components 2 according to the actual situation. Providing a plurality of suction components 2 increases the adsorption capacity of the goods pick-up mechanism, which can simultaneously pick up a plurality of boxes (i.e., pick up a greater number of boxes in a bundle), or a plurality of suction components 2 can simultaneously pick up a box of a larger size.

In this embodiment, the air guiding member 201 is tubular, one end of which being connected to the negative pressure port 302, and the other end of which being connected to the suction cup 202, the suction cup 202 being conical, with the large-diameter side facing the boxes, and the small-diameter side being connected to the air guiding member 201, wherein the large-diameter side of the suction cup 202 increases the contact area with the boxes, so that the boxes are adsorbed more firmly during the pick-up process.

By providing the suction cup 202, the contact area between the suction component 2 and the boxes is increased, so that the boxes are adsorbed more firmly when being picked up, and will not fall off during transportation and movement.

In one embodiment, the air distributor 4 is provided with an input port 401 and a plurality of output ports 402, the input port 401 is connected to the negative pressure port 302, a plurality of air guiding members 201 are spaced apart on the frame body 1, and each air guiding member 201 is respectively connected to the plurality of output ports 402.

Specifically, in this embodiment, the plurality of output ports 402 on the air distributor 4 are respectively connected to the plurality of air guiding members 201, and when the boxes are being picked up, the air distributor 4 can simultaneously pump the air between the plurality of suction cups 202 and the boxes through the air distributor 4 to the vacuum generator 3, so that the plurality of suction cups 202 can simultaneously pick up the boxes.

By providing the air distributor 4, the negative pressure generated by the vacuum generator 3 can be interconnected to the plurality of suction components 2, so as to adsorb the goods more firmly and avoid damage caused by the goods falling off during transportation.

In one embodiment, the goods pick-up mechanism further comprises a pressure regulating valve 5 provided on the frame body 1, wherein the pressure regulating valve 5 is configured to be connected between the air source and the air inlet 301.

By providing the pressure regulating valve 5, the air pressure input to the vacuum generator 3 can be adjusted, so that the pressure for generating negative pressure can be adjusted, so as to adjust the adsorption pressure to different levels for different boxes, thereby increasing the scope of applicability of the goods pick-up.

In one embodiment, the goods pick-up mechanism further comprises a switch 6 provided on the frame body 1, wherein the switch 6 is configured to be connected between the air source and the pressure regulating valve 5.

By providing the switch 6, the air fed to the vacuum generator 3 can be turned off when the goods are not being picked up, thereby avoiding air waste and saving air resources.

In one embodiment, the goods pick-up mechanism further comprises a connection plate 101 provided on the other side of the frame body 1 away from the goods to be picked up, wherein the connection plate 101 is configured to be connected to the robotic arm.

Specifically, in this embodiment, the connection plate 101 is provided with a plurality of air pipe holes 102 for connecting the output ports 402 with the air guiding members 201, the plurality of air pipe holes 102 being uniformly and symmetrically distributed so that the air guiding pipes can pass through the respective air pipe holes 102 to be connected to the corresponding air guiding members 201, and each air pipe hole 102 corresponds to a position of one suction component 2, so as to make the installation of the air guiding pipes have a neater arrangement and facilitate later maintenance.

In this embodiment, the frame body 1 is also provided with second connection plates 103, each suction component 2 is rotatably connected to a corresponding second connection plate 103, and the suction component 2 can be rotated to different angle positions by rotating the second connection plate 103, so as to pick up boxes at different positions or of different sizes.

Specifically, in this embodiment, one end of the second connection plate 103 is fixedly connected to the air guiding member 201, and the other end of the second connection plate 103 is rotatably connected to the frame body 1 by a hinge shaft.

According to an embodiment of the present invention, in a second aspect, a destacking apparatus is provided, wherein the apparatus comprises the goods pick-up mechanism in the above embodiments.

In one embodiment, the destacking apparatus further comprises a robotic arm and an actuator, wherein one end of the robotic arm is connected to the frame body 1, the actuator is connected to the other end of the robotic arm away from the frame body 1.

Specifically, in this embodiment, the actuator is installed in a production workshop, and the actuating end of the actuator is connected to the robotic arm for actuating and controlling the robotic arm to perform various actions, and the other end of the robotic arm is connected to the connection plate 101, so that the goods pick-up mechanism can be moved between the goods stacking area and the production line by means of the movement of the robotic arm.

In this embodiment, the destacking apparatus further comprises a controller, wherein the controller is signal-connected to both the actuator and the vacuum generator 3, and the actuator is controlled to cooperate with the vacuum generator 3 by means of the controller to complete the picking up, moving and disengaging of the goods.

By providing the robotic arm, it is easy to move the frame body to different positions, so that the goods on different stacks can be picked up, thereby increasing the range of the goods pick-up.

When the goods are being destacked, the frame body 1 is moved to the position of the goods and the suction component 2 is brought into contact with a surface of the goods, and the negative pressure generated by the vacuum generator 3 is communicated to the suction component 2 to suck out the air between the surface of the goods and the suction component 2, so that the goods are adsorbed onto the suction component 2 and the goods can be removed by moving the frame body 1. Since the suction component 2 only contacts the upper surface of the goods when picking up the goods, it can be ensured that only one piece of goods is picked up at a time, thereby facilitating the subsequent processes.

According to an embodiment of the present invention, in a third aspect, a destacking method is provided, using the destacking apparatus in the above embodiments, wherein the method comprises the following steps:

activating a switch 6 to connect the air source to a pressure regulating valve 5, wherein the pressure regulating valve 5 and the vacuum generator 3 are interconnected;

adjusting the pressure regulating valve 5 so that an air pressure that is input to the vacuum generator 3 can generate sufficient negative pressure for picking up the goods, wherein, when picking up smaller goods, the air input from the air source to the vacuum generator 3 can be reduced to avoid wasting of air, and when picking up larger goods, the air input from the air source to the vacuum generator 3 can be increased to increase the picking-up strength for the goods;

driving the robotic arm by an actuator to cause the robotic arm to move to a position of the goods to be picked up, and moving a suction cup 202 towards the goods to be picked up;

after the suction cup 202 picks up the goods, the actuator drives the robotic arm move to an unloading position, and puts down the goods for subsequent process operations.

When the goods are being destacked, the frame body 1 is moved to the position of the goods and the suction component 2 is brought into contact with a surface of the goods, and the negative pressure generated by the vacuum generator 3 is communicated to the suction component 2 to suck out the air between the surface of the goods and the suction component 2, so that the goods are adsorbed on the suction component 2 and the goods can be removed by moving the frame body 1 without manual transporting, which saves labor and improves the efficiency of transporting, thereby facilitating the subsequent processes.

Although the embodiments of the present invention are described in combination with the accompanying drawings, those skilled in the art may make various modifications and variations without departing from the spirit and scope of the present invention, and such modifications and variations fall within the scope defined by the appended claims.

REFERENCE NUMERALS

1, frame body; 101, connection plate; 102, air pipe hole; 103, second connection plate;
2, suction component; 201, air guiding member; 202, suction cup;
3, vacuum generator; 301, air inlet; 302, negative pressure port;
4, air distributor; 401, input port; 402, output port;
5, pressure regulating valve;
6, switch.

The invention claimed is:

1. A goods pick-up mechanism, comprising:
a frame body, configured to be connected to a robotic arm;
at least one suction component, arranged on one side of the frame body towards goods to be picked up;
a vacuum generator, fixedly mounted on the frame body, wherein one end of the vacuum generator is configured to be connected to an air source and the other end thereof is connected to the suction component, for generating and providing a negative pressure to the suction component; and
an air distributor, fixedly mounted on the frame body, wherein the air distributor is connected between the vacuum generator and the suction component,
wherein the vacuum generator is provided with a negative pressure port;
wherein each suction component comprises an air guiding member, fixedly mounted on the side of the frame body towards the goods to be picked up;
wherein the air distributor is provided with an input port and a plurality of output ports, the input port is connected to the negative pressure port, there are a plurality of air guiding members spaced apart on the frame body, and the plurality of output ports are respectively connected to the plurality of air guiding members;
the mechanism further comprises: a connection plate, provided on the other side of the frame body away from the goods to be picked up, wherein the connection plate is configured to be connected to the robotic arm;
wherein the connection plate is provided with a plurality of air pipe holes for connecting the output ports with the air guiding members, and each air pipe hole corresponds to a position of one suction component.

2. The goods pick-up mechanism according to claim 1, wherein the vacuum generator is provided with an air inlet and an air outlet, the air inlet, the air outlet and the negative pressure port are interconnected in a communicated manner, the air inlet is configured to be connected to the air source for inputting air, the air outlet is connected to external environment for discharging air, and the negative pressure port is connected to the suction component for outputting air between the suction component and the goods to be picked up to the air outlet.

3. The goods pick-up mechanism according to claim 2, wherein each suction component further comprises:
   a suction cup, with one end thereof connected to the air guiding member and the other end thereof configured to abut against the goods to be picked up.

4. The goods pick-up mechanism according to claim 3, wherein the mechanism further comprises:
   a pressure regulating valve, provided on the frame body, wherein the pressure regulating valve is configured to be connected between the air source and the air inlet.

5. The goods pick-up mechanism according to claim 4, wherein the mechanism further comprises:
   a switch, provided on the frame body, wherein the switch is configured to be connected between the air source and the pressure regulating valve.

6. A destacking apparatus, wherein the apparatus comprises:
   the goods pick-up mechanism according to claim 1.

7. The destacking apparatus according to claim 6, wherein the apparatus further comprises:
   a robotic arm, with one end of the robotic arm connected to the frame body;
   an actuator, connected to the other end of the robotic arm away from the frame body.

8. A destacking method, using the destacking apparatus according to claim 7,
   wherein the method comprises the following steps:
      activating a switch to connect the air source to the vacuum generator;
      adjusting a pressure regulating valve so that an air pressure that is input to the vacuum generator can generate sufficient negative pressure for picking up the goods;
      driving the robotic arm by the actuator to move to a position of the goods to be picked up, and moving a suction cup towards the goods to be picked up;
      after the suction cup picks up the goods, the actuator drives the robotic arm to move to an unloading position.

* * * * *